United States Patent [19]
Horiba et al.

[11] Patent Number: 5,843,490
[45] Date of Patent: Dec. 1, 1998

[54] DIE HAVING PROTRUSIONS FOR MOLDING MACHINE

[75] Inventors: Nobuaki Horiba, Nagakute-machi; Masaaki Iwami, Nagoya; Mitsuo Shiomi, Toyama, all of Japan

[73] Assignees: Tosoh Corporation, Yamaguchi-ken; Sanyu Tokushu Seikoh Limited Liability Company, Aichi-ken, both of Japan

[21] Appl. No.: 499,809

[22] Filed: Jul. 10, 1995

[30] Foreign Application Priority Data

Jul. 15, 1994 [JP] Japan .................................. 6-163666
Jul. 15, 1994 [JP] Japan .................................. 6-163667

[51] Int. Cl.$^6$ .................................................. B29C 47/20
[52] U.S. Cl. ..................... 425/380; 425/133.1; 425/382.4
[58] Field of Search .............................. 425/133.1, 200, 425/208, 382.4, 380; 264/108, 349

[56] References Cited

U.S. PATENT DOCUMENTS

| | | |
|---|---|---|
| 2,937,402 | 5/1960 | Pierce . |
| 3,008,187 | 11/1961 | Slade ...................................... 425/380 |
| 3,099,860 | 8/1963 | Schippers ................................ 425/380 |
| 3,146,495 | 9/1964 | Sanford ................................... 425/380 |
| 3,899,276 | 8/1975 | Sokolow .................................. 425/380 |
| 4,088,434 | 5/1978 | Fukuda et al. ........................... 425/380 |
| 4,151,242 | 4/1979 | Sansone .................................. 264/349 |
| 4,574,067 | 3/1986 | Cerny et al. ........................... 425/382.4 |
| 4,731,216 | 3/1988 | Topolski ................................. 425/380 |
| 5,461,898 | 10/1995 | Lessen .................................... 425/380 |
| 5,522,719 | 6/1996 | Umeda et al. ........................ 425/382.4 |

Primary Examiner—James P. Mackey
Attorney, Agent, or Firm—Nixon & Vanderhye, P.C.

[57] ABSTRACT

Die for a molding machine for molding a molten resin into a desired shape including hollow articles, coated articles, pipes, films and sheets. The die includes a stationary outer die with an internal wall, a stationary inner die having an external wall, with the internal and external walls defining a resin flow channel. Protrusions for eliminating line marks in product molded in the die are provided on the external wall of the inner die, or the internal wall of the outer die, or on both the internal wall of the outer die and external wall of the inner die An inlet is provided for introducing molten resin into the flow channel and a die lip is located towards the downstream end of the flow channel. The protrusions extend into the flow channel between the inlet and the die lip, and do not contact the opposite facing wall.

6 Claims, 6 Drawing Sheets

| TORPEDO PORTION | SPIDER PORTION | TAPER PORTION | LAND PORTION |

CROSSHEAD PORTION

TAPER PORTION

LAND PORTION

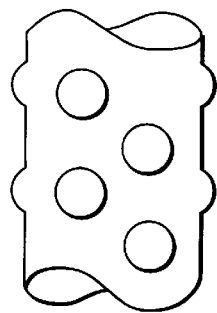 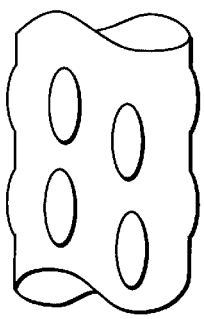 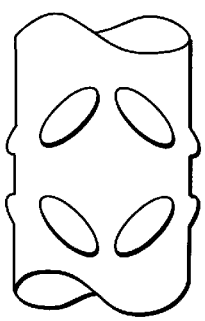 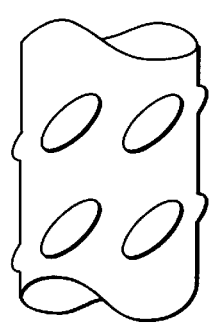
*Fig. 3A*  *Fig. 3B*  *Fig. 3C*  *Fig. 3D*
*Fig. 4*
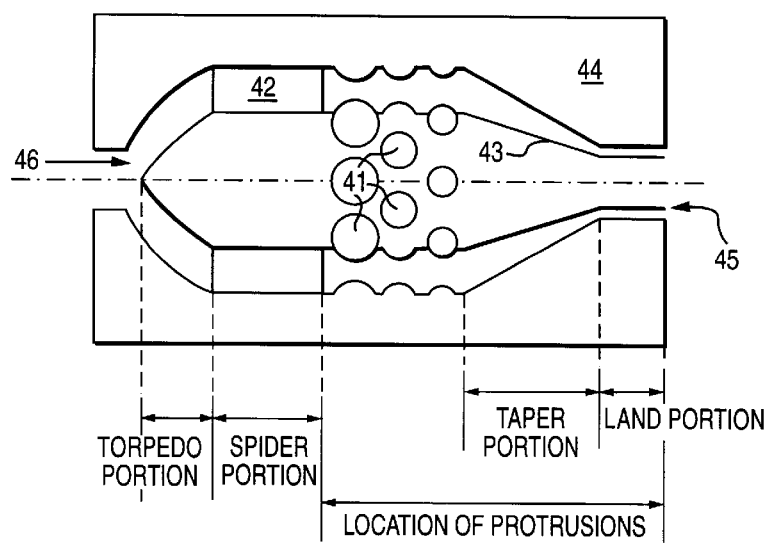

DIE HAVING PROTRUSIONS FOR MOLDING MACHINE

BACKGROUND OF THE INVENTION

1. Field of the Invention

The present invention relates to a die for a molding machine for forming a molten resin material into a desired shape such as hollow articles, coated articles, tubes, films, and sheets.

The molded articles produced by use of the die of the present invention include multi-layered products formed from two or more kinds of resins as well as mono ayered products formed from a single resin.

2. Description of the Related Art

In a mold for extrusion molding of a molten resin material, an assembly of supporting arms called a spider is provided in the resin flow channel to hold an inner die in an outer die.

FIG. 1 shows an example of the shape of a resin flow channel in a mold employing a spider assembly. In such a system, the molten resin material fed into the mold 13 at 15 is driven to pass beside a warhead-shaped torpedo portion 16 and a spider assembly 11, thereby the resin flow being divided an cut by the spider. After passing the spider assembly, the molten resin material comes to be joined and fused together at a taper portion 12 and a land portion 14. However, line marks called "spider marks" appear in the extrusion direction in the extruded product. The line marks affect adversely the external appearance, and the properties, especially strength, of the molded product undesirably. For example, the extruded tubular films have lower tensile strength in a peripheral direction, and the extruded pipes or tubes have lower crushing strength, disadvantageously.

Generally, in order to offset the above disadvantages, the diameter of the spider portion is reduced gradually toward the land portion, and thereby the annular cross-sectional area of the resin flow channel between the outer die and the inner die is constricted gradually to raise the resin pressure to force the divided resin parts to be bonded together by the pressure. In another way, projections called weirs are provided on the periphery of the inner die to pressurize the resin to press-bond it. In any of the above methods, however, the line marks will not be completely eliminated from the resin with the memory of the division remaining in the resin.

In blow molding of a molten resin material into a hollow article, the extruded molten resin flow is turned by 90° by means of a crosshead.

FIG. 2 shows an example of the resin flow channel in a die 18 having a crosshead portion 19, an inner die 23, an outer die 21, a taper portion 22 and a land portion 24. In such a system, the molten resin material is extruded by a screw horizontally into the die flows at 25, where its flow direction is changed by 90° by the crosshead. This flow direction change will cause nonuniformity of the resin flow owing to the difference of the flow path length at the inlet side from that at the reverse side, and obstruction of flow by the inner die at the region between the crosshead portion and the die lip portion. This non-uniformity of the resin flow causes non-uniformity of the temperature and the discharge of the molten resin material, resulting in irregularity of the product thickness.

The molten resin material fed into the die collides against the inner die in the crosshead portion, and thereby is separated into a fraction passing the right side of the inner die 23 and another fraction passing the left side thereof. The fractions come to be joined together at the side reverse to the resin inlet in the crosshead portion. At the joining portion, line marks called "weld lines" are formed in the molded products in the extrusion direction.

The non-uniform flow and the formation of the line marks affects greatly and adversely the external appearance and the properties of the molded resin products. In particular, in blow molding, the above adverse effects would prevent formation of a normal parison to give no satisfactory molded product, or cause non-uniformity of wall thickness of the parisons to give low strength of the molded products. In wire coating also, the above adverse effects would result in insulation failure of the electric wire owing to the non-uniformity of the resin layer thickness. In extrusion molding of pipes and bottles, the above adverse effects would give insufficient crushing strength of the molded products owing to the non-uniformity of the resin wall thickness.

In order to offset the above adverse effects, measures are generally taken such as provision of manifolds or a throttle in the resin flow channel in the die, or setting of the die lip eccentric to the inner die. Even with such measures, however, the molten resin still memorizes the effects of the division at the crosshead portion with the line marks remaining, although the resin flow is made uniform. No methods has been found which offsets simultaneously the above adverse effects.

SUMMARY OF THE INVENTION

An object of the present invention is to solve the above problems and to provide a novel die for a molding machine which does not give line marks in the molded products, and which is provided with protrusions on an internal wall of a molten resin flow channel to raise pressure and to cause turbulence in the molten resin, thereby making uniform the molten resin material to eliminate line marks from the molded article.

The present invention provides a die for a molding machine for molding a molten resin into a desired shape including hollow articles, coated articles, pipes, films and sheets, the mold comprising protrusions, in a molten resin flow channel having a spider assembly, between the spider assembly and a die lip on an external wall of an inner die and/or an internal wall of an outer die, or, in the molten resin flow channel having a crosshead, between the crosshead and a die lip on an external wall of an inner die and/or an internal wall of an outer die.

BRIEF DESCRIPTION OF THE DRAWINGS

FIGS. 3A, 3B, 3C and 3D show schematically different protrusions of the present invention.

FIG. 4 shows schematically an example of the die of a spider type of molding machine of the present invention.

DETAILED DESCRIPTION OF THE PREFERRED EMBODIMENTS

Figure 1:
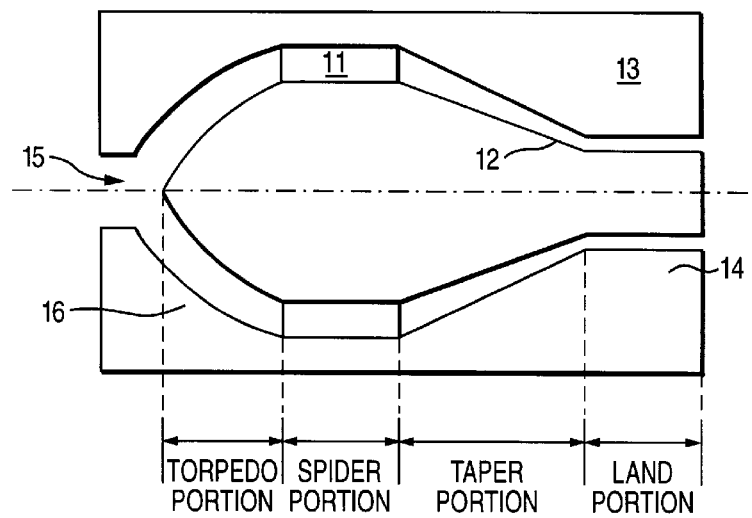
FIG. 1 shows schematically a cross-section of a die of a conventional spider type of molding machine.
Figure 2:
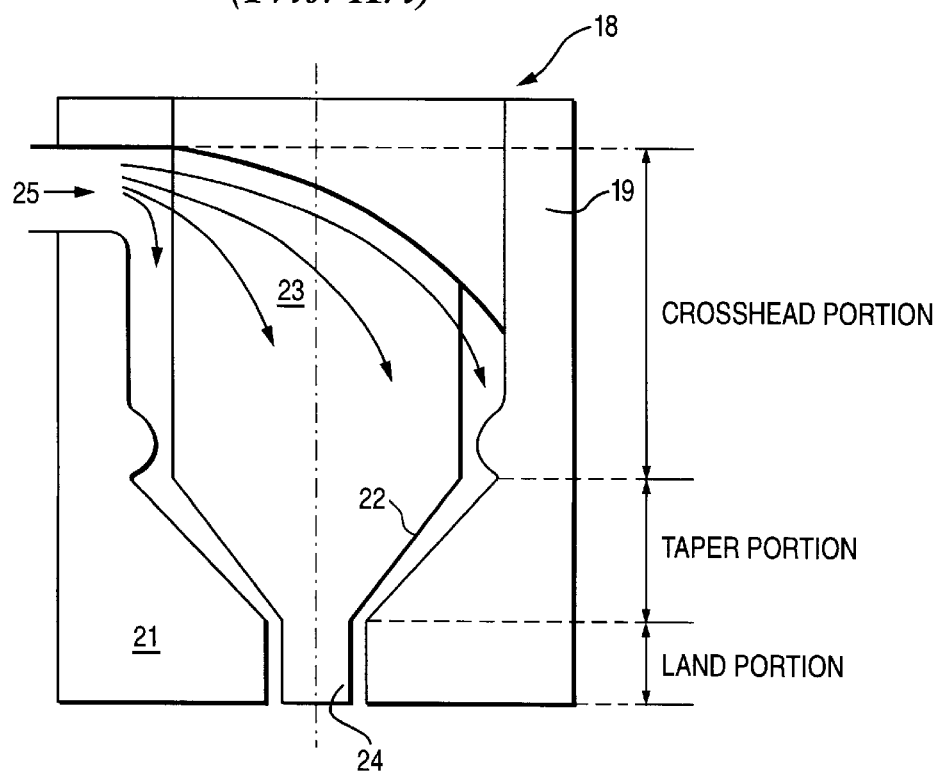
FIG. 2 shows schematically a cross-section of a die of a conventional crosshead type of molding machine.

The die for a molding machine of the present invention is characterized by plural protrusions which are provided in a molten resin flow channel.

In an embodiment, in a molding machine having a spider assembly in the die for extruding a molten resin into a tubular shape (e.g., films, pipes, tubes, etc. , into a sheet shape, or a desired profiled article, the protrusions are provided between the spider assembly and a die lip on an external wall of an inner die and/or an internal wall of an outer die in a flow channel. More specifically, the protrusions are provided on the external wall of the inner die and/or the internal wall of a outer die in the flow channel having a spider assembly. In particular it is effective to provide the protrusions just downstream of the site where molten resin is divided and cut.

The arrangement of the protrusions is not limited, provided that the protrusions are placed to give pressure to the flowing molten resin and to cause turbulence of the resin flow.

FIGS. 3A–3D show examples of the shapes and arrangement of the protrusions. The shape of the protrusion is not specially limited provided that it causes turbulent (or mixing) of the molten resin material. In particular, a partial spherical shape is effective.

FIG. 4 shows an example of a die 44 of the present invention. The die has protrusions 41, a spider 42, an inlet 46, a torpedo portion 47, a taper portion 43 and a land portion 45.

Figure 5B:
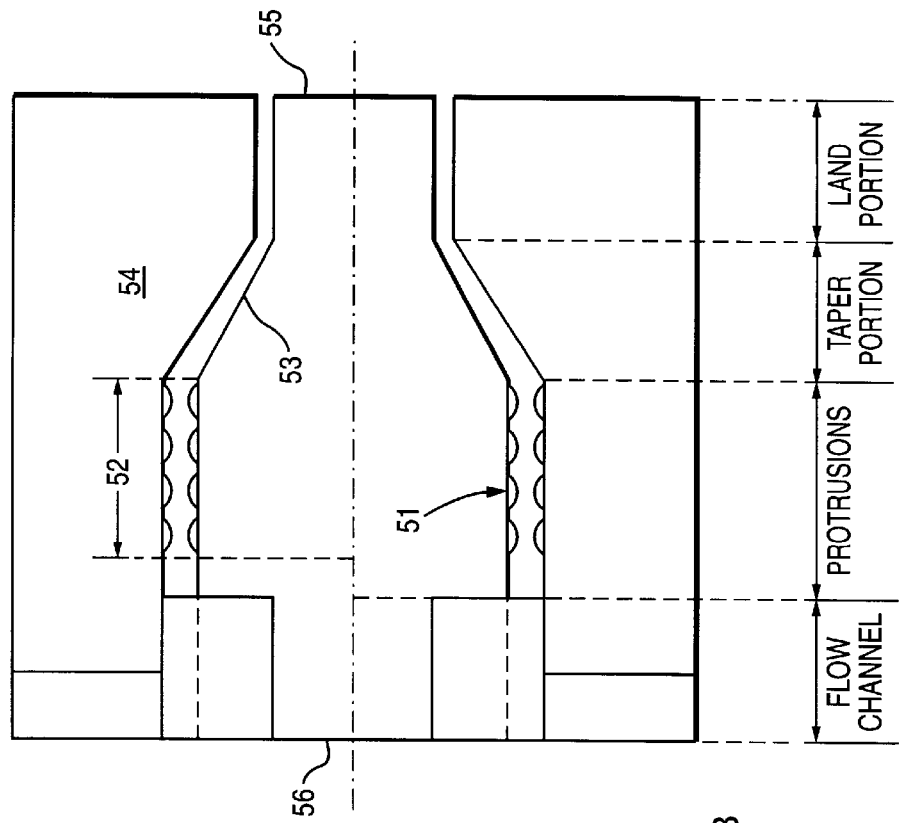
FIG. 5 shows another example of the die of a spider type of molding machine of the present invention.
Figure 5A:
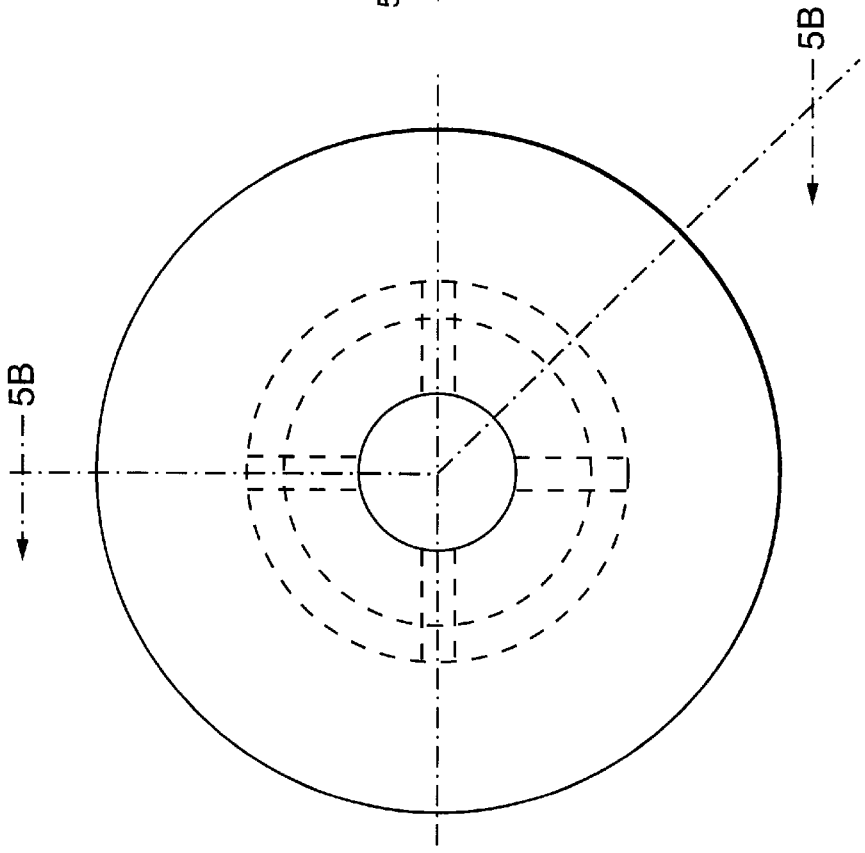

FIG. 5 shows another example of a die 54 of the invention. The die has an inlet 56, protrusions 51 in section 52, a taper portion 53 and a land portion 55.

Figure 6:
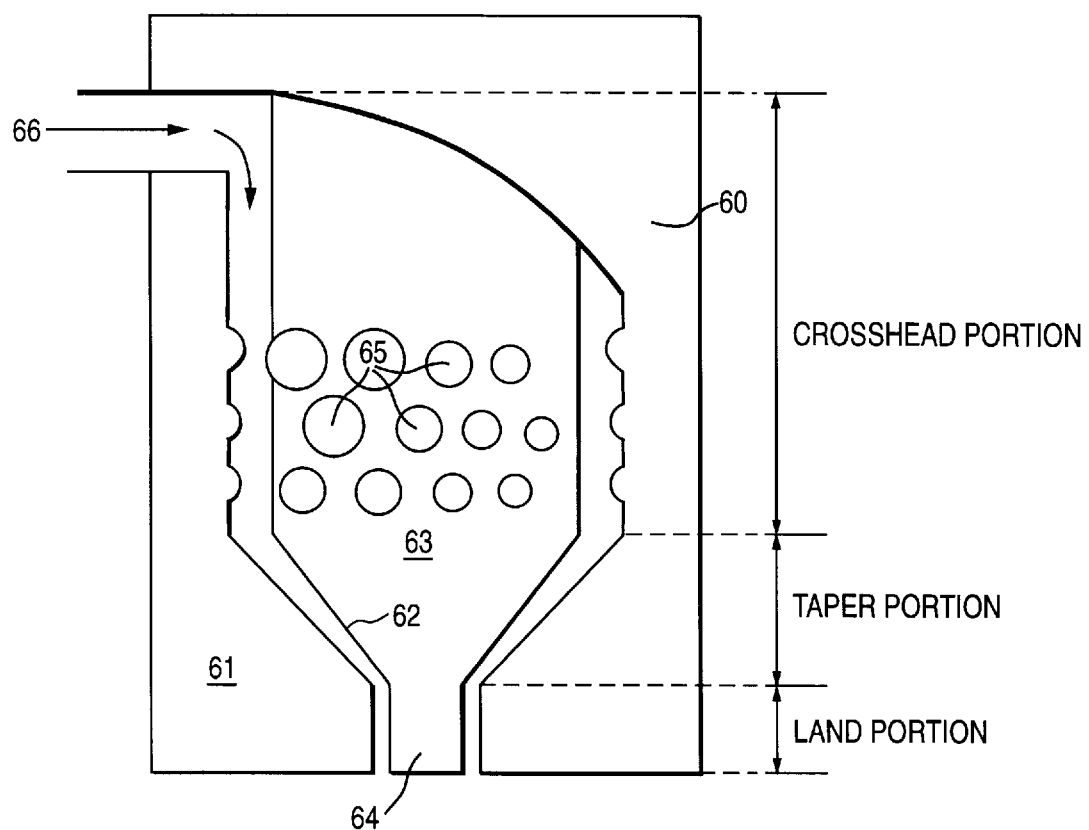
FIG. 6 shows an example of the die of a crosshead type of molding machine of the present invention.

In another embodiment, shown in FIG. 6 in a molding machine having a crosshead 60 in the die, the protrusions 65 are provided between a crosshead and a die lip 64 on an external wall of an inner die and/or 63 an internal wall of an outer die 61 in the flow channel having a crosshead. More specifically, the protrusions are provided on the external wall of the inner die and/or the internal wall of the outer die. In particular, it is effective to provide the protrusions at a portion where the flow channel of the molten resin is turned by 90°.

The arrangement of the protrusions is not limited, provided that the protrusions are placed to give pressure to the flowing molten resin entering at 66 and to cause turbulence of the resin flow. FIG. 3 shows examples of the shape of the protrusions. The shape of the protrusion is not specially limited thereto. Protrusions in a partial sphere shape are particularly effective.

Figure 7:
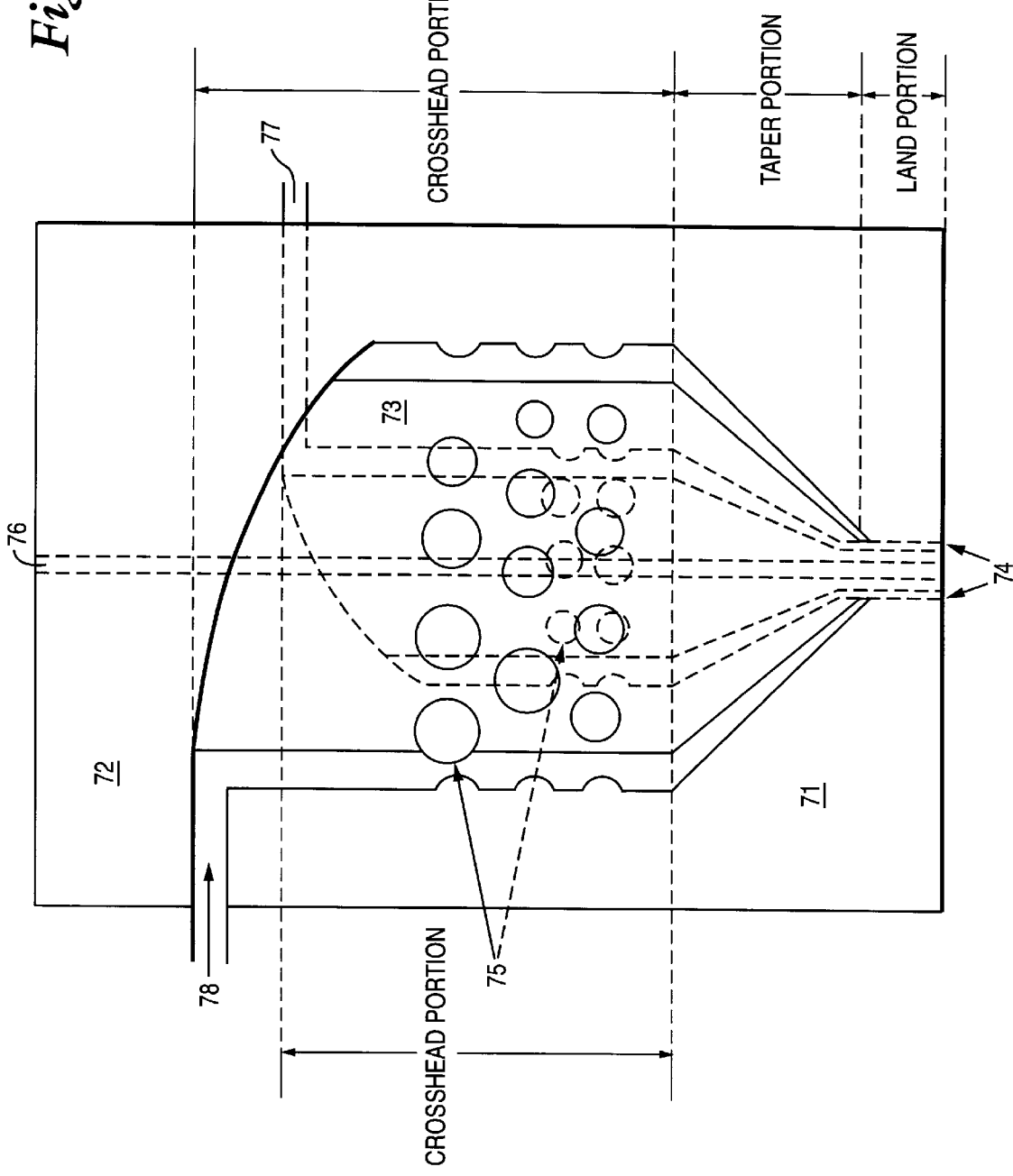
FIG. 7 shows an example of the die having protrusions of the present invention for coating a copper wire with a multi-layered resin.

The embodiment of FIG. 6 is an example of a die having the protrusions of the present invention for blow molding machine. FIG. 7 shows an example of a die having the protrusions of the present invention for a wire coating machine for multi-layer coating of a wire. The die shown in FIG. 7 has protrusions 75, an inner die 73, an outer die 71, a land portion 74, inlets 77, 78 and a further inlet 76 extending through body 72.

Figure 8:
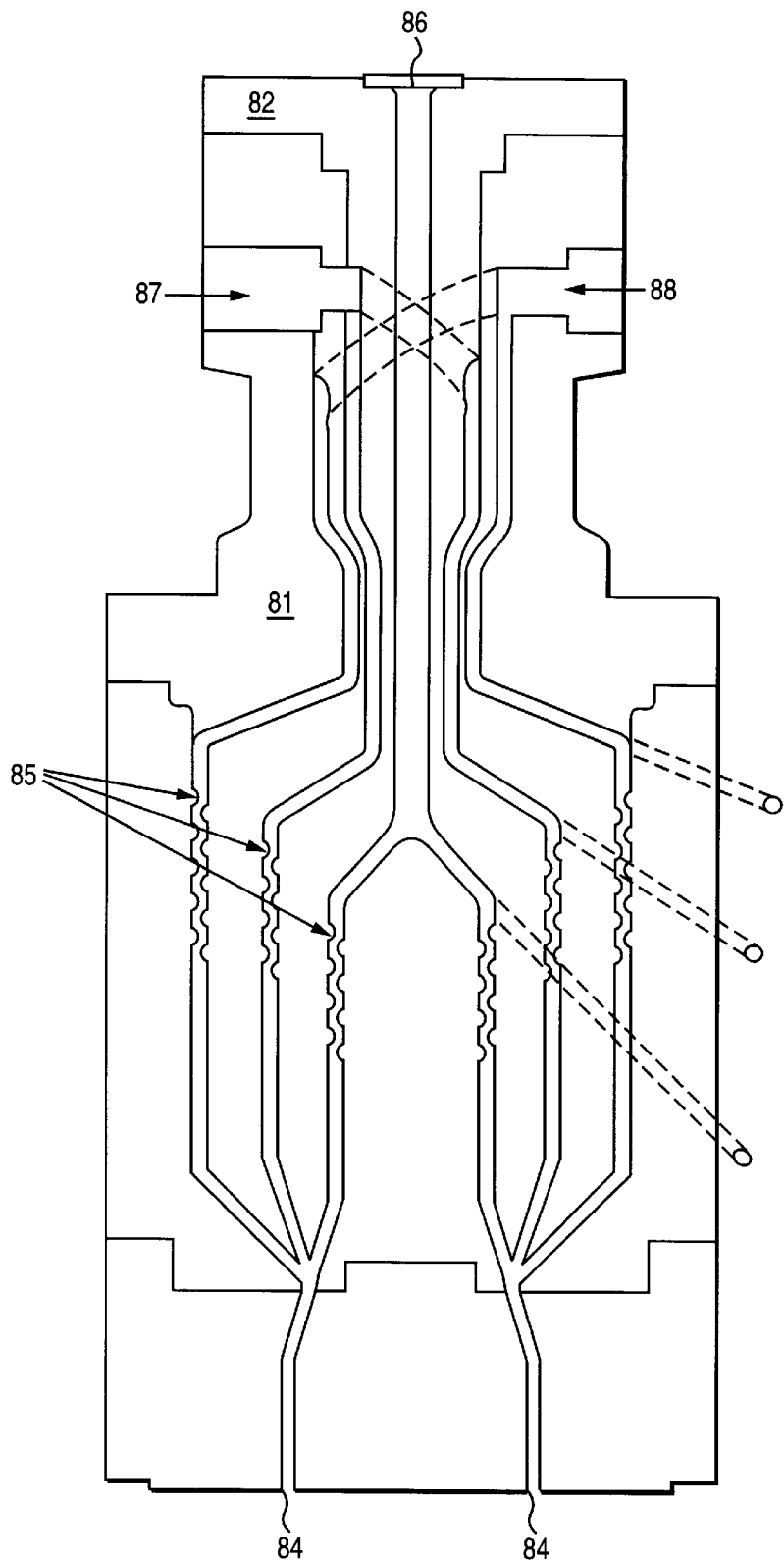
FIG. 8 shows an example of the die of the present invention for extruding a multi-layered film.

FIG. 8 is another example of a die 81 of the present invention for extruding a multi-layered film. The die includes inlets 87 and 88, and a further inlet 86 extending through rear portion 82. The die includes flow channels extending through to ends 84 with protrusions 85.

The construction material for the die for the molding machine is not specially limited. The material includes ceramics such as zirconia, and carbon steel such as S55C and hard chromium-plated carbon steel. From ceramic material, the die can be formed by casting. Fron carbon steel like S55C, the die can be formed by cutting work.

The present invention is described below in more detail by reference to Examples without limiting the invention thereto.

EXAMPLE 1

A tubular film of high density polyethylene was produced under the conditions below.
(1) Die:
  Inside diameter of spider portion: 50 mm,
  Outside diameter of spider portion: 60 mm,
  Diameter of die lip: 75 mm, Lip gap: 2 mm
(2) Protrusion:
  Shape: Fraction of sphere, Number: 40 protrusions
  Maximum height: 3 mm
(3) Resin:
  HD polyethylene, produced by Tosoh Corporat ion
(4) Extruder:
  Screw diameter: 50 mm, L/D: 28
(5) Molding conditions:
  Extrusion temperature: 190° C., Blow ratio: 3.4,
  Film size: 400 mm (folding width)×15 $\mu$m ( thickness)

The inner die and outer die were prepared from powdery zirconia by casting.

Consequently, the produced film of high density polyethylene had high quality without a spider mark.

EXAMPLE 2

A film of low density polyethylene was produced under the same conditions as in Example 1. Consequently, the produced film of low density polyethylene had high quality without a spider mark.

EXAMPLE 3

A film of linear low density polyethylene was produced under the same conditions as in Example 1. Consequently, the produced film of linear low density polyethylene had high quality without a spider mark.

EXAMPLE 4

A blend of low density polyethylene (80%) with linear low density polyethylene (20%) was molded into a film under the same conditions as in Example 1. Consequently, the resulting film of a blend of low density polyethylene (80%) with linear low density polyethylene (20%) had high quality without a spider mark.

EXAMPLE 5

A pipe of flexible polyvinyl chloride was produced under the conditions below.
(1) Die:
  Inside diameter of spider portion: 50 mm,
  Outside diameter of spider portion: 60 mm,
(2) Protrusion:
  Shape: Fraction of sphere, Number: 40 protrusions
  Maximum height: 3 mm
(3) Resin:
  Flexible polyvinyl chloride, produced by Tosoh Corporation (4) Extruder:
   Screw diameter: 50 mm
(5) Molding conditions:
   Extrusion temperature: 170° C.,
   Pipe diameter outside: 25 mm
   Pipe diameter inside: 21.2 mm
   The inner die and and outer die were prepared from powdery zirconia by casting.
   Consequently, the produced pipe of high density polyethylene had high crushing strength and high quality without a spider mark.

EXAMPLE 6

A pipe of rigid polyvinyl chloride was produced under the same conditions as in Example 5. Consaquently, the produced pipe had high quality and high crushing strength with the spider marks being dispersed.

EXAMPLE 7

Hollow containers of high density polyethylene was produced by blow molding under the conditions below.
(1) Outer die/inner die:
   Diameters: 21 mm/18.5 mm,
(2) Extruder:
   Screw diameter: 45 mm
   Screw revolution speed: 20 radians/min
(3) Protrusion:
   Shape: Fraction of sphere, Number: 42 protrusions
   Maximum height: 3.5 mm
(4) Resin:
   High density polyethylene, produced by Tosoh Corporation
(5) Molding conditions:
   Extrusion temperature: 180° C.,
   Blowing pressure: 4 kg/cm$^2$
   The inner die and outer die employed were prepared from powdery zirconia by casting and subsequent sintering of the cast matter at 1500° C.
   Consequently, the produced container of high density polyethylene had excellent external appearance without a line mark.

EXAMPLE 8

Hollow containers of low density polyethylene was produced under the same conditions as in Example 7. Consequently, the produced container of low density polyethylene had excellent external appearance without a line mark.

EXAMPLE 9

Hollow containers of linear low density polyethylene was produced by blow molding under the same conditions as in Example 7. Consequently, the produced container of linear low density polyethylene had excellent external appearance without a line mark.

EXAMPLE 10

A copper wire was coated with plural kinds of resins (inside layer: Low density polyethylene resin, outside layer: flexible polyvinyl chloride resin) by extrusion molding under the conditions below:
(1) Outer die/inner die:.
   Diameters: 9 mm/7.5 mm,
(2) Extruder:
   Screw diameter: 45 mm
   Screw revolution speed: 20 radians/min
(3) Protrusion:
   Shape: Fraction of sphere, Number: 42 protrusions
   Maximum height: 3.5 mm
(4) Resins:
   Inside layer: Low density polyethylene, produced by Tosoh Corporation,
   Outside layer: Flexible polyvinyl chloride, produced by Tosoh Corporation,
(5) Molding conditions:
   Extrusion temperature: 180° C.,
   Copper wire outside diameter: 3 mm
   The inner die/outer die employed were produced from powdery zirconia by casting and subsequent sintering of the cast matter at 1500° C.
   Consequently, the produced copper wire coated with
   Consequently, the produced copper wir coated with a multi-layered film had excellent external appearance without a line mark.

EXAMPLE 11

A three-layered film, which is constituted of inside layer of linear low density polyethylene, an intermediate layer of EVA (ethylene-vinyl acetate copolymer), and outside layer of linear low density polyethylene, was produced by use of the mold shown in FIG. 8 by extrusion molding under the conditions below:
(1) Outer die/inner die:
   Diameters: 21 mm/18.5 mm,
(2) Extruder:
   Screw diameter: 45 mm
   Screw revolution speed: 20 radians/min
(3) Protrusion:
   Shape: Fraction of sphere, Number: 42 protrusions
   Maximum height: 3.5 mm
(4) Molding conditions:
   Extrusion temperature: 180° C.,
   Consequently, the produced three-layered film had excellent external appearance without a line mark.

In an extrusion molding system having a spider assembly, when the die is used which has protrusions of the present invention in the molten resin flow channel, the molten resin divided and cut into pieces by the spider reaches the first protrusion, and a part of the resin goes over the protrusion and the other part thereof goes past the side of the protrusion. Then the molten resin reaches the next protrusion, and flows in the same manner as above. The molten resin material is repeatedly pressurized and made turbulent (mixed) by the above process. Thereby , the line mark portions of the molten resin are made to adhere to each other and are mixed by the turbulent flow to allow the line mark in the flow direction to disappear.

Therefore, the use of the die of the present invention for an extrusion molding machine is expected to offset the disadvantages which are caused by the line mark such as insufficient tensile strength, insufficient crushing strength, and poor external appearance, and further to eliminate non-uniformity of wall thickness of the molded article.

In an extrusion molding system having a crosshead, when the die is used which has protrusions of the present invention in the molten resin flow channel, the molten resin material is repeatedly pressurized and made turbulent by the protrusions to be uniform, whereby the line marks are eliminated.

Therefore, the use of the die of the resent invention for an extrusion molding machine is expected to eliminate the disadvantages which are caused by the line mark such as insufficient tensile strength, insufficient crushing strength, and poor external appearance, and further to eliminate the disadvantages caused by non-uniform wall thickness of the molded article such as insufficient strength of the molded articles and insufficient insulation of coated wire.

What is claimed is:

1. A die for a molding machine for molding molten resin into a desired shape, said die comprising:

a stationary outer die having an internal wall;

a stationary inner die having an external wall, said internal and external walls defining a resin flow channel having an upstream end and a downstream end;

inlet means for introducing a molten resin into said flow channel;

a die lip located towards said downstream end of said flow channel;

a taper portion upstream of said die lip:

protrusion means for eliminating the marks in a product molded in said die, said protrusion means consisting of
   first protrusion means provided on said internal wall of said outer die, and
   second protrusion means provided on said external wall of said inner die, said first and second protrusion means extending respectively into said flow channel between said inlet means and said taper portion, said first protrusion means not contacting said external wall of said inner die, said second protrusion means not contacting said internal wall of said outer die, the shape of said protrusion means being partially spherical, and a spider assembly located in said flow channel upstream of said protrusion means.

2. A die for a molding machine for molding molten resin into a desired shape, said die comprising:

a stationary outer die having an internal wall;

a stationary inner die having an external wall, said internal and external walls defining a resin flow channel having an upstream end and a downstream end;

inlet means for introducing a molten resin into said flow channel;

a die lip located towards said downstream end of said flow channel;

a taper portion upstream of said die lip;

a non-taper portion upstream of and adjacent to said taper portion;

a spider assembly located in said flow channel upstream of and adjacent to said non-taper portion;
   first protrusion means for eliminating line marks in a product molded in said die provided on said internal wall of said outer die;
   second protrusion means for eliminating line marks in a product molded in said die provided on said external wall of said inner die, said first and second protrusion means extending respectively into said flow channel between said spider assemby and said taper portion, said first protrusion means not contacting said external wall of said inner die, said second protrusion means not contacting said internal wall of said outer die and the shape of said protrusion means extending into said flow channel being partially spherical.

3. A die according to claim 1 or 2, wherein said flow channel tapers towards said downstream end.

4. A die for a molding machine for molding molten resin into a desired shape, said die comprising:

a stationary outer die having an internal wall;

a stationary inner die having an external wall, said internal and external walls defining a resin flow channel having an upstream end and a downstream end;

inlet means for introducing a molten resin into said flow channel, said inlet means including a crosshead;

a die lip located towards said downstream end of said flow channel;

a taper portion upstream of said die lip;

protrusion means for eliminating line marks in a product molded in said die said protrusion means consisting of,
   first protrusion means provided on said internal wall of said outer die; and
   second protrusion means provided on said external wall of said inner die, said first and second protrusion means extending respectively into said flow channel between said inlet means and said taper portion, said first protrusion means not contacting said external wall of said inner die and said second protrusion means not contacting said internal wall of said outer die, said protrusion means being partially spherical.

5. A die for a molding machine for molding molten resin into a desired shape, said die comprising:

a stationary outer die having an internal wall;

a stationary inner die having an external wall, said internal and external walls defining a resin flow channel having an upstream end and a downstream end;

inlet means for introducing a molten resin into said flow channel, said inlet means including a crosshead;

a die lip located towards said downstream end of said flow channel;

a taper portion upstream of said die lip;

a non-taper portion upstream of and adjacent to said taper portion which defines a crosshead portion;
   first protrusion means for eliminating line marks in a product molded in said die provided on said internal wall of said outer die;
   second protrusion means for eliminating line marks in a product molded in said die provided on said external wall of said inner die, said first and second protrusion means extending respectively into said flow channel in said crosshead portion and upstream of said taper portion, said first protrusion means not contacting said external wall of said inner die, said second protrusion means not contacting said internal wall of said outer die and the shape of said protrusion means extending into said flow channel being partially spherical.

6. A die according to claim 4 or 5, wherein said flow channel turns 90 degrees from said crosshead toward said protrusion means.

* * * * *